Oct. 1, 1957 — D. H. FULLER — 2,808,580
FLOW ALARM
Filed May 28, 1956 — 3 Sheets-Sheet 1
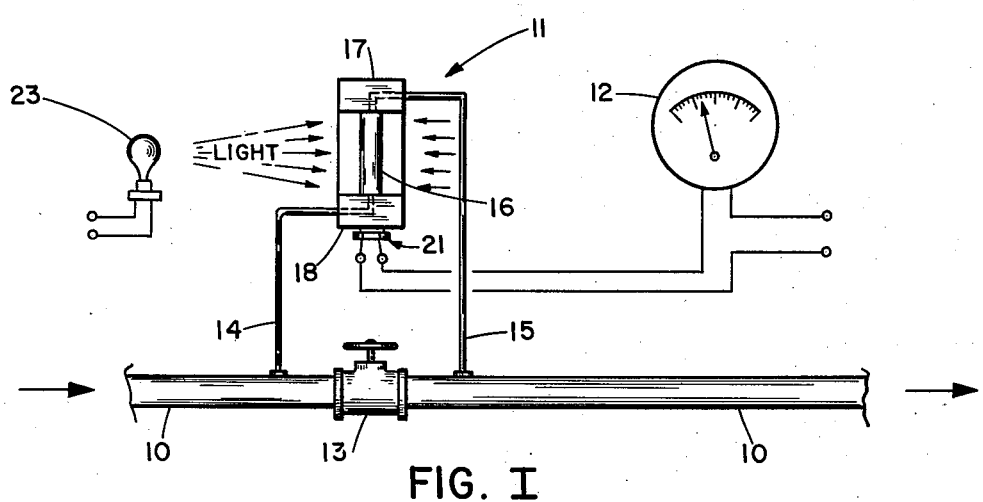
FIG. I
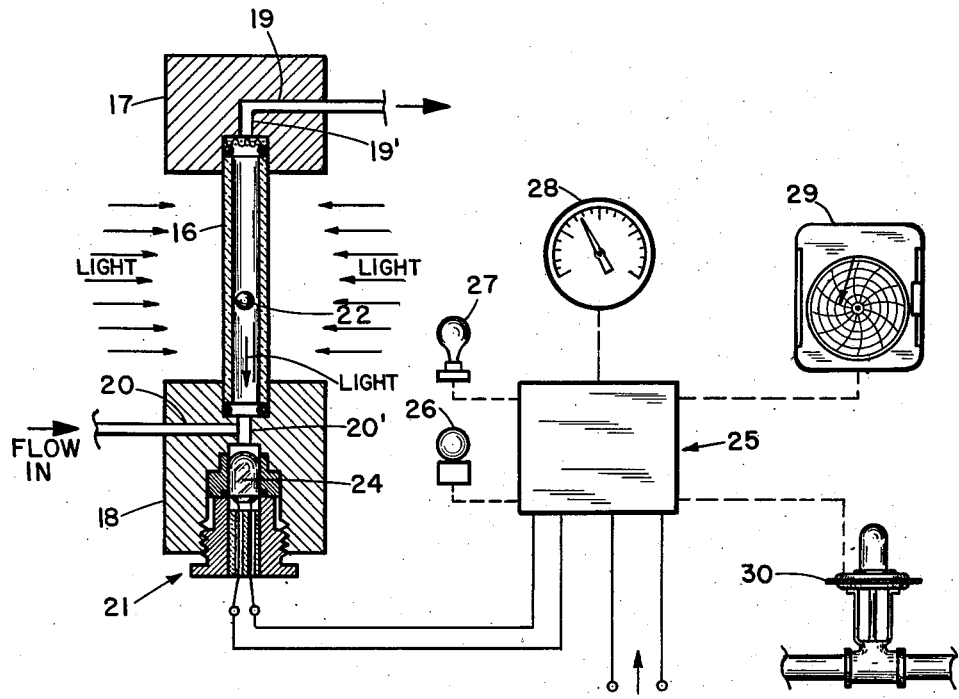
FIG. II
ELECTRIC SOURCE
INVENTOR
DAVID H. FULLER
BY
Lawrence H. Patton
AGENT

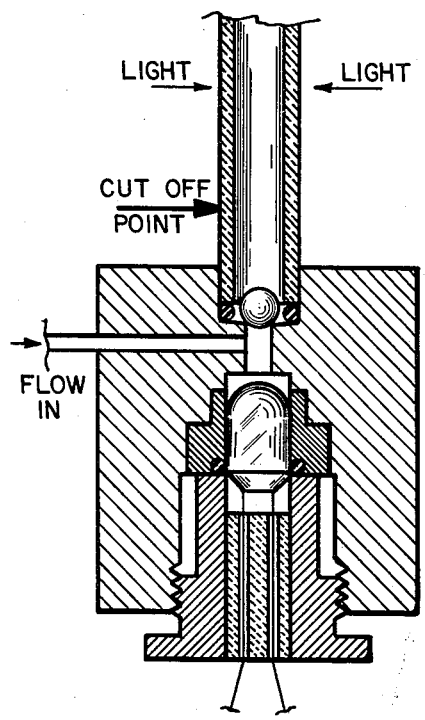
FIG. III
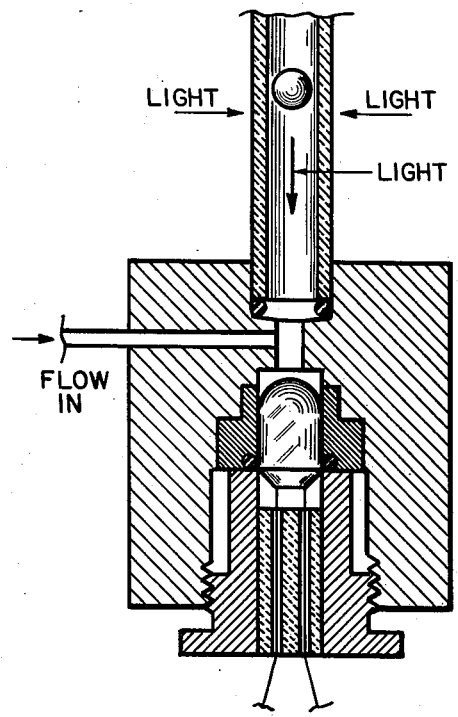
FIG. IV
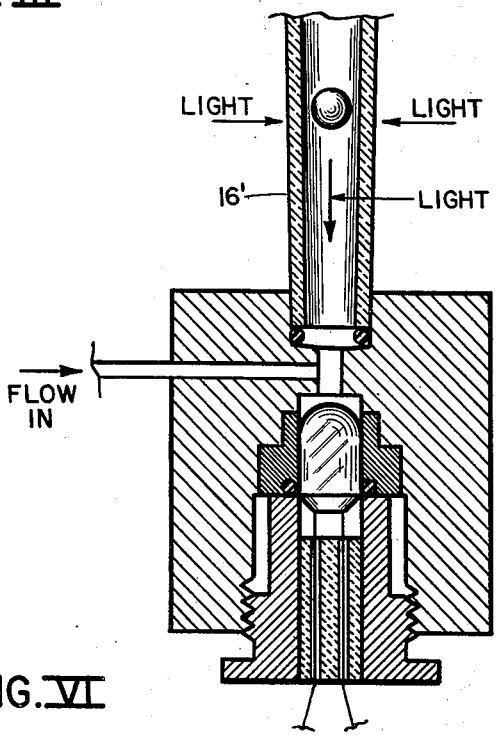
FIG. VI
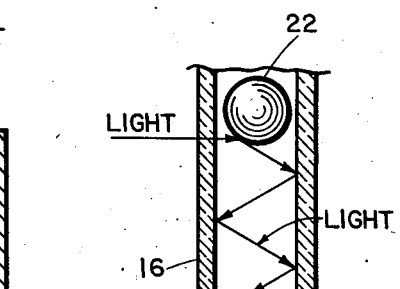
FIG. V

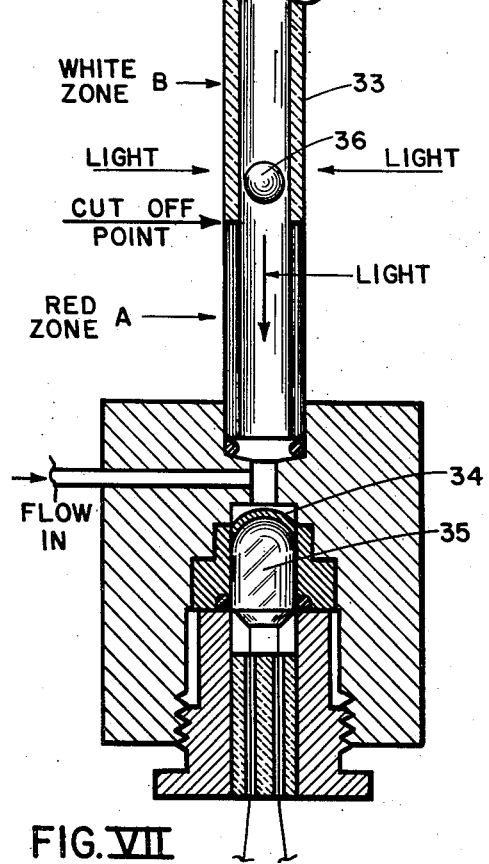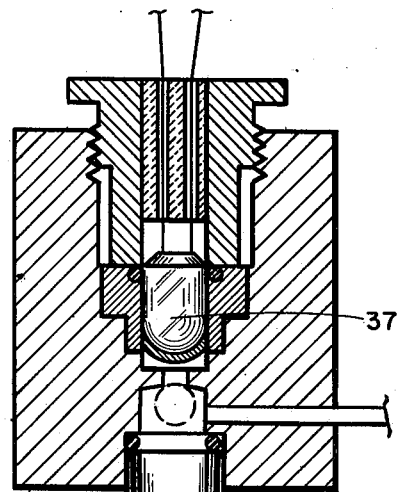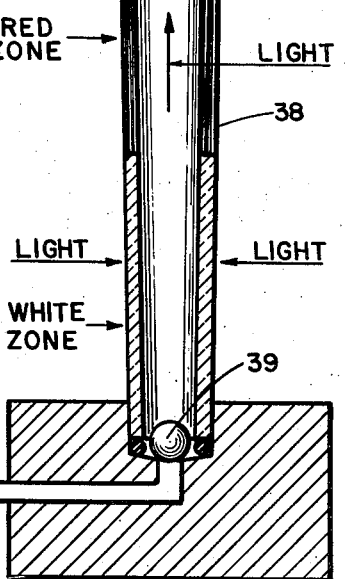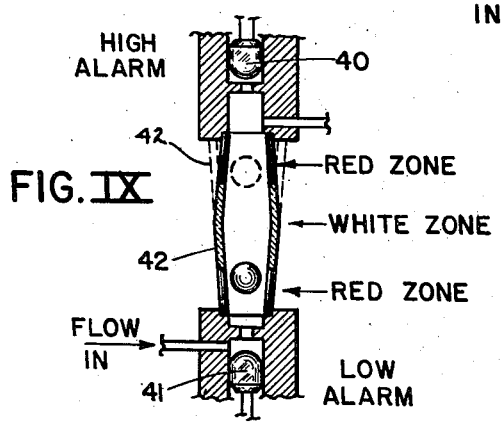

United States Patent Office 2,808,580
Patented Oct. 1, 1957

2,808,580

FLOW ALARM

David H. Fuller, Wrentham, Mass., assignor to The Foxboro Company, Foxboro, Mass., a corporation of Massachusetts Application May 28, 1956, Serial No. 587,701

3 Claims. (Cl. 340—239)

This invention relates to alarm devices and has particular reference to optical arrangements in such devices as applied to fluid flows in industrial processes or experimentation.

For example, in the process of gas analysis of continuous streams of gases, a gas analyzer is used and is provided with a normally continuous flow of sample gas. It is in many cases very important to avoid any interruption, substantial change, or cessation of such sample flow, since often an entire plant operation is based upon the results obtained by such an analyzer. Loss of flow customarily does not readily become apparent from a prior art analyzer reading since it merely remains at the last indicated value just prior to loss of flow. The rates of such flows may be quite low. In many cases the rate is less than one cubic foot per hour. Conventional flow meters designed for larger flows are either not sensitive enough or too complicated and expensive to be practical when coupled with alarm devices and applied to low rate flows or to small changes in flows.

The device of this invention is particularly applicable as an alarm device for low rate fluid flows and utilizes a photo-electric cell arrangement.

Whereas conventional photo-electric cell arrangements would be ambiguous with respect to a movable light interceptor in that there would be no identification difference between light interceptor positions on either side of a direct line between a light source and a photo-electric cell, the device of this invention utilizes tunnel optics to provide an unambiguous determination of the position of such a light interceptor.

An illustrative example of this invention is a combination of a transparent, vertically disposed tube which in operation will have a fluid flow upwardly therethrough, a ball floating in the fluid flow in the tube, and a photo-electric cell at the bottom of the tube, such that ambient or other light entering the tube from the sides thereof will reflect from the lower half of the ball and proceed downwardly through the tube to the photo-electric cell. When the fluid flow lessens, the ball falls, and at a predetermined cutoff point light is no longer reflected from the bottom of the ball in sufficient amount to operate the photo-electric cell, and an alarm may thus be actuated. This arrangement is unambiguous, that is, it is determinable whether the ball is above or below the cutoff point.

It is therefore an object of this invention to provide a new and improved fluid flow alarm device.

It is a further object to provide an unambiguous photo-electric fluid flow alarm device through the use of tunnel optics.

Other objects and advantages of this invention will be in part apparent and in part pointed out hereinafter and in the accompanying drawings, wherein:

Figure I illustrates a fluid flow alarm device according to this invention, in association with a gas analysis flow stream;

Figure II shows the main part of Figure I in vertical central section, and indicates various alarm devices usable therewith;

Figure III is an enlarged section of the photo-electric cell area of Figures I and II, illustrating a condition of no fluid flow;

Figure IV is a duplicate of Figure III, illustrating a condition of normal fluid flow;

Figure V illustrates the action of "tunnel optics" with respect to this invention;

Figure VI illustrates an alternate structure of this invention, wherein a tapered flow tube is used;

Figure VII illustrates another alternate structure of this invention, wherein a flow tube having a different color length section is used;

Figure VIII illustrates another alternate structure of this invention in which the color sections of Figure VI are reversed, and the flow tube is tapered; and Figure IX illustrates a further alternate structure of this invention, showing a photo-electric cell at each end of the flow tube for use as both a high and low flow alarm device, with a double color section arrangement.

The Figure I illustration of an embodiment of this invention includes, generally, a gas flow pipe line 10 for carrying a stream of sample gas to a gas analyzer installation (not shown). Mounted on the pipe 10 is a photo-electric flow alarm device 11, and an electrical meter 12 is provided in association with the alarm device as an alarm indicator. The pipe 10 is provided with an adjustable valve 13 with sample flow by-pass pipes 14 and 15 tapped into the pipe 10 respectively upstream and downstream of the valve 13. Thus a suitable sample flow through the by-pass pipes 14 and 15 may be assured by adjustment of the valve 13. The upstream by-pass pipe 14 is connected to the bottom of a vertical light tube 16 in the alarm device 11, and the downstream by-pass pipe 15 is connected to the top of the light tube 16. Thus a by-pass flow system is provided through the alarm system.

Figures I and II considered together illustrate the details of this illustrative embodiment of this invention. Thus the light tube 16 is formed of transparent glass and has its ends mounted and peripherally sealed in end blocks 17 and 18. Further, the by-pass pipes 14 and 15 are connected to the ends of the light tube 16 by means of passages 19 and 20 in the end blocks 17 and 18 respectively. The block passages 19 and 20 each have short sections 19' and 20' in axial continuance of the light tube 16, and are then laterally angled to meet the by-pass pipes 14 and 15. At the lower end of the light tube 16, the short passage section 20' is extended downward beyond the laterally angled section of the passage 20, and opens on a photo-electric cell assembly 21 mounted in the block 18.

Within the light tube 16, a ball 22 is floated in vertically variable position by the gas flow upward through the light tube.

Thus, with the ball 22 floating in the light tube 16, as light enters the light tube 16 through the side walls thereof, a substantial amount of the light reflects downward from the under side of the ball 22 and proceeds down the light tube 16 to the photo-electric cell assembly 21, either directly, or by tunnel optics, that is, by a series of reflections back and forth across the inside of the light tube.

The light source may be ambient light, a specific source as indicated in Figure I at 23, or a combination of the two, as necessary or desirable for a particular application.

The enlargement Figures III and IV illustrate the action of the ball 22 with respect to the structure of Figures I and II, Figure IV shows the ball 22 suspended in the light tube 16 by upwardly flowing gas, with light entering the light tube through the side walls thereof and being reflected downward from the under side of the ball 22 to the photo-electric cell assembly 21. Thus with the gas flowing properly through the light tube 16, a photo-electric cell 24 in the assembly 21 is actuated, and by suitable conventional arrangements as indicated in Figure II by block 25, this actuation prevents the operation of an alarm device such as one of those shown in Figure II in connection with the block 25, i. e., a ball 26, a lamp 27, a pressure indicator 28, a recorder 29, or a pneumatic control valve 30. An electrical indicator such as shown at 12 in Figure I might also be used, or other similar suitable alarm indicating or operating device.

Figure III illustrates the action of the device when the fluid flow fails. The ball 22 drops to the bottom of the light tube 16 and covers the end opening of the block passage 20 in such a manner as to block off the light from the light tube 16 so that it does not reach the photo-electric cell 24. The electrical arrangements within the (Figure II) block 25 are conventionally such that failure of light to the photo-electric cell 24 results in the actuation of the selected alarm device. Thus fluid flow failure or predermined reduction, in the light tube 16 actuates an alarm device as desired. As the ball 22 drops because of flow reduction, it at some point no longer reflects sufficient light downward to actuate the photo-electric cell 24. This may be called the cut-off point and it is arbitrarily indicated in Figure III by arrow 32.

Accordingly, this device is unambiguous, that is, with the ball 22 anywhere above the cut-off point it is determinable that there is at least a predetermined minimum fluid flow through the light tube 16. Also, with the ball 22 anywhere below the cut-off point it is determinable that there is less than the predetermined minimum fluid flow through the light tube 16. This determination may be either visual by simply observing the position of the ball 22 vertically in the light tube 16 by looking through the walls thereof, or automatically by the actuation or non-actuation of the selecetd alarm device.

Figure V illustrates the "tunnel optics" action of this invention, i. e., the reflecting back and forth across the interior of the light tube 16 of the light rays as they travel downward within the light tube after being reflected downwardly from the under side of the ball 22.

Figure VI illustrates a light tube and photo-cell structure like that of Figures I–IV except that the light tube 16' is tapered conically upward and outward so that the ball 22 may be floated in the light tube more gradually and the ball may be more precisely fitted to the interior of the light tube at the bottom end thereof while still making it possible for the gas to flow past the ball after it has been raised a bit into a vertical light tube 16'.

Figure VII illustrates an alternate light tube photo-electric cell structure of this invention. This structure is like that of Figures I–IV except that the light tube 33 is formed in two lengths of different colors. Length A is red and length B is white, or plain glass. A further difference is that a red filter 34 is placed over the photo-electric cell 35. Thus the cut-off point in this instance is at the dividing line of the two colors. When the ball 36 is up in the white zone B of the light tube, white light enters through the side walls of the light tube and is reflected downward from the under side of the ball 36 to actuate the photo-electric cell 35, without effective impedance by the red filter 34. However, when the ball 36 is in the red zone A of the light tube, the downwardly reflected light is in the main red, and so is largely stopped by the red filter 34, so that the photo-electric cell 35 is no longer actuated, and the selected alarm device is actuated.

Figure VIII illustrates a high flow alarm device with photo-electric cell 37 at the top of a light tube 38. Thus an undesirably high flow would push a ball 39 upwards sufficiently to block off the photo-electric cell 37 and cause the actuation of an alarm unit. Whereas any of the light tube arrangements of this invention may be adapted for use in a high flow alarm device, this particular instance (Figure VIII) is shown with a tapered light tube having color zones reversed with respect to those of Figure VII.

Figure IX illustrates a combination high and low flow alarm device according to this invention, wherein two photo-electric cells 40 and 41 are used, one at the top and one at the bottom of the light tube. As a specific illustration in this instance the light tube 42 is shown with a top and bottom taper arrangement, and the previously described color zone arrangements for each of the high and low flow alarm portions of the light tube 42.

This double taper tube arrangement may be dimensioned for a high flow lockup action if desired. A simple high and low flow alarm combination may be provided by the use of a single taper tube, as indicated by dotted lines at 42', or other tube formations similarly suitable for this purpose.

It should be understood that the structures of Figures III–IX are applicable to the alarm system of Figures I and II with suitable rearrangements with respect to the high flow alarm device of Figure VIII and the combination device of Figure IX.

This invention, therefore provides a new and improved fluid flow alarm device.

As many embodiments may be made of the above invention, and as changes may be made in the embodiments set forth above, without departing from the scope of the invention, it is to be understood that all matter hereinbefore set forth or shown in the accompanying drawings is to be interpreted as illustrative only and not in a limiting sense.

I claim:

1. An alarm device for determining an undesirable fluid flow condition comprising, in combination, a tapered, vertically disposed, light permeable fluid flow tube, a photo-electric cell optically open to said tube adjacent one end thereof, and a light reflector ball disposed in said tube for floating movement therein relatively with respect to said photo-electric cell in response to fluid flow through said tube, whereby said photo-electric cell is actuated in accordance with the degree and nature of light reflected thereupon from said ball.

2. A combination high and low fluid flow alarm device comprising a member having a fluid flow passage therein, two photo-electric cells, one adjacent each end of said passage and optically open thereto, means for introducing light into said passage for travel therealong to each of said photo-electric cells, and movable light interception means in said passage for varying said light to said photo-electric cells, said light interception means being supportable by fluid flow through said passage as a means of moving said light interception means with respect to said photo-electric cells to vary the effect of said light to said photo-electric cells.

3. A device for providing alarm actuation upon the occurrence of an undesiarble fluid flow condition combination, a member having a fluid flow passage with tapered, vertically disposed, light permeable walls in zones adapted for the admission of different colors of light, a photo-electric cell optically open to said passage at one end thereof, means for introducing light into said passage for travel therealong to said photo-electric cell, and a movable light interception member in the form of a ball in said passage for varying said light to said photo-electric cell, said light interception ball being supportable by fluid flow through said passage as a means of moving said ball with respect to said photo-electric cell to vary the effect of said light to said photo-electric cell, and said color zones being established with respect to the said movement of said ball whereby the operational positioning of said in said different color zones results in respectively related different reactions of said photo-electric cell.

References Cited in the file of this patent

UNITED STATES PATENTS

| 2,091,303 | Brelsford | Aug. 31, 1937 |
| 2,620,385 | Grant | Dec. 2, 1952 |

FOREIGN PATENTS

| 600,450 | Great Britain | Apr. 8, 1948 |